July 3, 1928.

H. C. KIRK 1,676,230

PROCESS OF TREATING OILS

Filed Dec. 8, 1927

2 Sheets-Sheet 1

H. C. KIRK.
INVENTOR.

BY Sol Shappirio
ATTORNEY.

July 3, 1928.
H. C. KIRK
1,676,230
PROCESS OF TREATING OILS
Filed Dec. 8, 1927  2 Sheets-Sheet 2
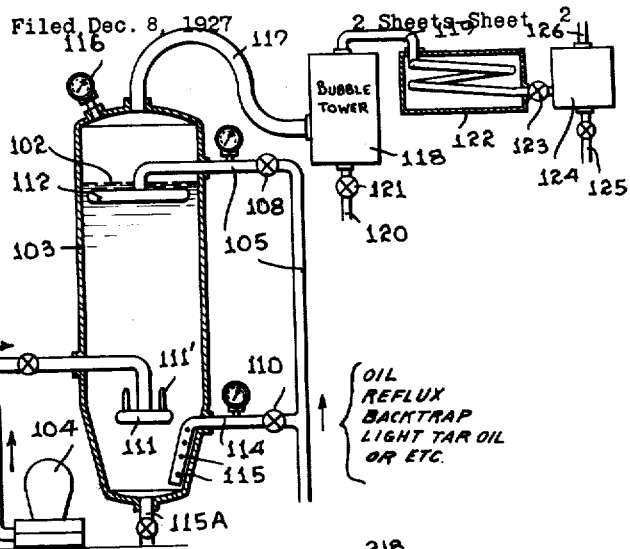
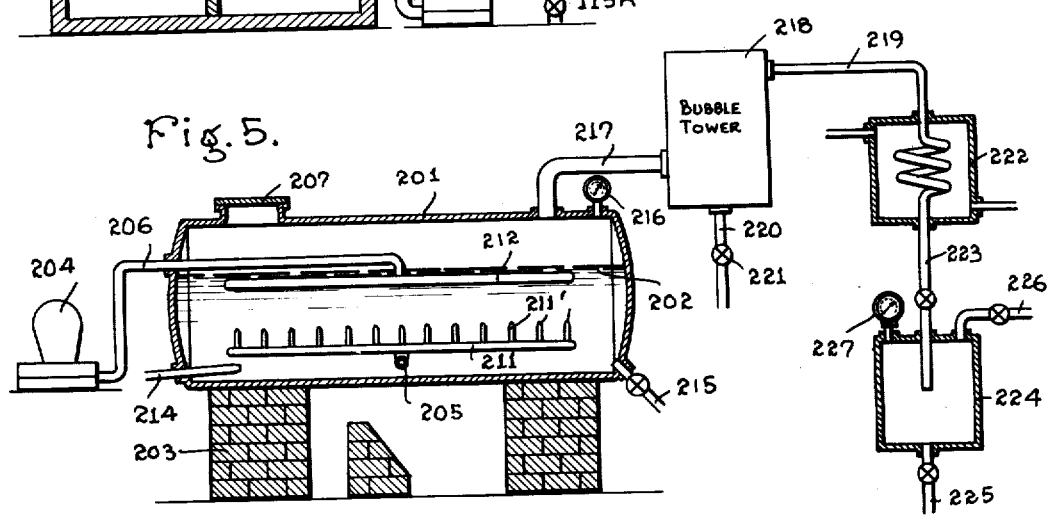
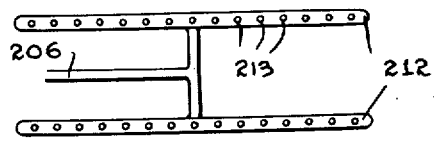
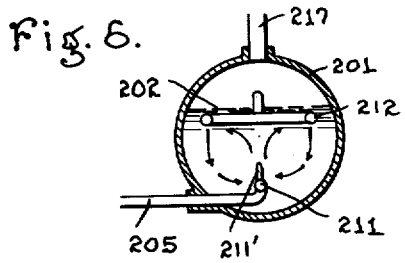
H. C. KIRK.
INVENTOR.
BY Sol Shappirio
ATTORNEY.

Patented July 3, 1928.

1,676,230

UNITED STATES PATENT OFFICE.

HENRY C. KIRK, OF BALTIMORE, MARYLAND.

PROCESS OF TREATING OILS.

Application filed December 8, 1927. Serial No. 238,649.

This invention relates to processes of treatment of oils, and particularly hydrocarbon oils, and apparatus therefor.

In the prior art methods of heat treating oils for the recovery of gasoline and other products therefrom, considerable difficulty has been experienced in operating such processes due to the formation of carbon. Shutdowns are frequently required due to the accumulation of this carbon in the system or apparatus, necessitating its removal before operation can be begun again. Such shutdowns not only are uneconomical due to the discontinuity of the process, but there is a tremendous element of expense in labor involved in the removal of the accumulated carbon, which is hard and graphitic or coke-like. The suggestions in the prior art for elimination of "carbon" trouble are legion, but heretofore no successful solution of the problem has been found.

One of the primary objects of the present invention is the elimination of the formation of hard or coke-like or graphitic carbon during the heat treatment of oils, and particularly in processes known as "cracking" processes.

Many other and further objects and advantages will appear from the more detailed description set forth below, it being understood however that this more detailed description is given by way of illustration, and not as limiting, since various changes therein may be made by those skilled in the art without departing from the scope and spirit of this invention.

Figure 1:
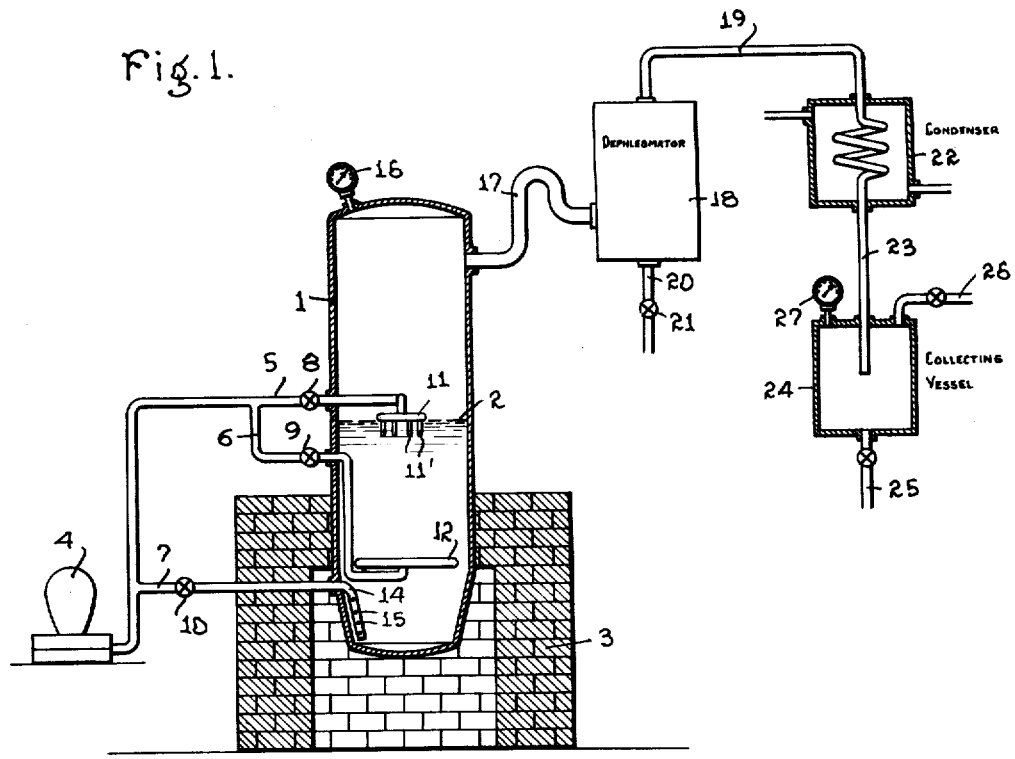
Figure 3:
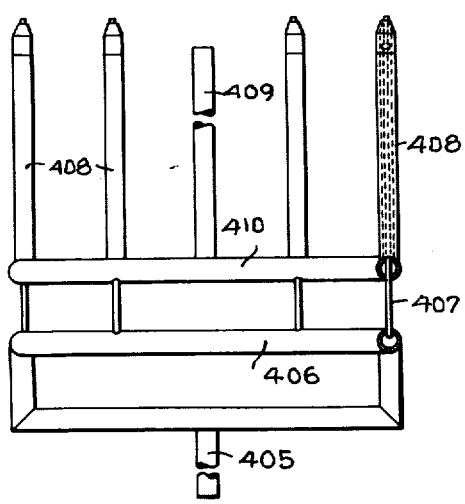
Figure 2:
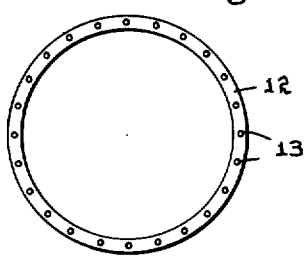

Supplementing such more detailed description there is shown in the accompanying drawings, in Figure 1, a diagrammatical elevation partly in section of a still and associated apparatus elements embodying the invention; in Figure 2, a detail of a spray ring used in the apparatus of Figure 1; in Figure 3, a detail partly in section of a modified form of oil injection nozzle; in Figure 4, a diagrammatical elevation partly in section of a modified form of apparatus embodying the invention; in Figure 5, a horizontal, externally fired still involving the invention; in Figure 6, an end view partly in section of the still of Figure 5; and in Figure 7, a plan view of the spray device used in the still of Figure 5.

The invention is well illustrated in its application to the heat treatment of petroleum oils, it being understood however that such illustration is exemplary only. In carrying out such processes positive, controlled, uniform circulation of the oil undergoing treatment is maintained at all times within the body of oil or other material undergoing treatment. This method of preventing the formation or deposition of hard carbon during the heat treatment of oils is explained below in connection with several different methods of carrying out such heat treatments.

In the apparatus illustrated in Figure 1, an externally heated vertical still 1, filled with oil to any desired level 2, is heated as by furnace 3, the latter being sufficient to maintain the oil undergoing treatment at the desired temperature. Oil pumped in by pump 4 enters the still by pipes 5, 6 and 7 provided with valves 8, 9 and 10 respectively. The pipe 5 leads to an injector or rose 11 having downwardly directed nozzles 11', the injector or rose being placed somewhat below the upper level of oil so that it is submerged in the same. The pipe 6 leads to a spray ring 12 placed near the lower level of oil having a series of openings or jets 13 in its upper wall so that oil leaving said openings or jets is forced upwardly into the body of oil. The pipe 7 connects with a lowermost oil inlet pipe 14 arranged substantially vertical and paralleling the conical bottom of the still 1; said pipe 14 being provided with openings 15 in its side wall adapted to project oil into the body of oil below the spray ring, and give to such oil below the spray ring a circulatory movement. A pressure gage 16 is also provided. Vapors and gases may be drawn off through pipe 17 into a dephlegmator 18 or analogous device from which any material not condensed passes out by way of pipe 19. Any liquid collecting in the dephlegmator may be withdrawn therefrom through pipe 20 provided with valve 21. The pipe 19 leads to a condenser 22 provided with outlet pipe 23 connected to a storage vessel or similar chamber 24. Liquid may be withdrawn from the storage vessel by means of valve controlled pipe 25. Vapors and gases may pass out of this vessel through the valve controlled pipe 26. The storage vessel is desirably provided with a pressure gage 27, and may also carry a relief valve (not illustrated) set for any desired pressure.

In the utilization of the apparatus shown in Figure 1, the still is filled with oil to the desired level. This oil may be preheated in any desired preheaters (not shown) or may be brought to the desired temperature by the furnace 3. Temperature and pressure conditions having been adjusted as desired in the still, to maintain the proper operating conditions, oil is continuously pumped into the still by means of pump 4. The oil entering through the nozzles 11' is injected downwardly setting up a downwardly moving column of oil within the center of the body of oil. At the same time, oil entering through the spray ring 12 is projected upwardly within the body of oil setting up an upwardly moving outer sheath of oil. When such upwardly moving oil reaches the upper level of the body of oil undergoing treatment, the vapors and gases carried therein are liberated and pass into the vapor space above the body of oil. The oil itself is carried over to the central portion of the body of oil where it is carried downwardly with the oil injected through the nozzles 11'. When the downwardly moving oil reaches a zone approximately on a level with the spray ring 12, it moves outwardly and then passes upwardly with the streams of oil entering through the jets 13. In this way a positive circulation of oil is continuously maintained within the body of oil undergoing treatment. In order that there may be no quiescent zone below the spray ring, the oil entering below such ring, through the pipe 14 and openings 15, moves the oil circumferentially until it is withdrawn through a tar line (not shown). Any heavier material which may settle into the bottom of the still below the spray ring, is thus kept in circulation until it is removed through said tar line.

By the devices illustrated and explained above, it is thus seen that circulation of the oil within the body of oil itself, that is being treated, is maintained at all times so that no portion thereof is allowed to come to rest at any time within the still proper. Furthermore the rate of circulation of the oil is substantially uniform throughout the body of oil undergoing treatment. Since the formation of hard, adherent, coke-like carbon in any substantial amount appears to take place only when the heated oil is allowed to come to rest on a heated surface or in contact with a heated substance, the continuous, forced, but uniform circulation maintained throughout the body of oil substantially eliminates the formation of such hard carbon. Any carbon formed is soft, or mud-like, and collects with the tarry or heavier bodies in the bottom of the still where it is constantly kept in circulation until removed through the tar line.

It should further be noted, that in the externally heated still of Figure 1, the oil streams injected through the spray ring 12 carry the oil upwardly in the outer zone of the body of oil. This movement is particularly desirable since the vapors and gases that form in the outer hotter portions of the oil, are carried along with the upwardly moving current of oil to the upper zone where they escape into the vapor space. These vapors and gases are thus confined within the upwardly moving current of oil without the generation of wild gas or vapor bubbles that would seriously interfere with the circulatory currents set up in the body of oil.

While as set forth above, the pump 4 forces oil through the inlet pipes 5, 6 and 7, if desired separate pumps may be used with each of these inlets. The oil used need not be untreated stock alone, but such untreated stock may be admixed with other oil or materials, which additional oils may be obtained at various points in the process itself or from outside sources. In general, it is more economical to use backtrap or returned oil obtained for example from the dephlegmator or bubble towers as well as the lighter oils which separate in the tar tank, which oils are desirably used in mixture with the fresh stock. As exemplary of this feature, part or all of the condensate or liquid recoverable from pipe 20 may be fed back to the oil inlet to pump 4 so that it may pass into the still with fresh oil; or if desired a separate pump may be used to inject such oil into one or all of the inlet pipes 5, 6 and 7.

As illustrative of the application of the invention to the tube and drum methods of treating oil, the diagrammatic illustration of Figure 4, is exemplary. In this instance oil pumped in by pump 104 passes through a tube 101 heated by furnace 102. The passage of oil through this tube is sufficient to heat the oil up to or somewhat above that temperature at which the heat treatment is to be maintained, but the speed of the oil through tube 101 is sufficiently great so that the oil does not remain therein long enough to undergo any substantial amount of cracking or other heat treatment. From tube 101, the oil passes through the oil injector 111 provided with nozzles 111', into the soaking drum 103, containing oil up to a desired level 102. The oil in drum 103 is maintained under such pressure and temperature conditions as are required for the particular operation in hand. The oil injected through nozzles 111' produces an upwardly moving column of oil within the body of oil in the drum. A spray ring 112 fed with oil coming from pipe 105 through valve 108, delivers a number of streams of oil downwardly within the body of oil, thus setting up a downwardly moving, outer zone of oil, encasing the upwardly moving central column of oil. As a result, circulatory movement within the body of oil is maintained, downwardly in the outer portion of the body of oil, and then upwardly within the center thereof. Vapors and gases which are generated in the soaking drum, are confined within the upwardly moving central column of oil, so that no wild gas or vapor bubbles are formed which would seriously interfere with the circulatory movements produced in the body of oil undergoing treatment. The vapors and gases, while within such a rising central column, serve to enhance the movement of the column of oil, until they reach the upper level of the body of oil. From here they escape into the vapor space above the oil and exit through the pipe 117. Tar and relatively heavy products settle below the nozzles 111', into the bottom of the still where they are maintained in circulation by means of oil from pipe 114 provided with openings 115 in its side wall serving to divide such incoming oil into circulation-producing streams. The oil fed into pipe 114 may be obtained from pipe 105 and its entrance into pipe 114 may be controlled by valve 110. The tar and similar material is thus kept in motion, until withdrawn through the tar line 115A. Vapors and gases passing off through pipe 117 may be led to bubble towers 118 or equivalent chambers from which liquid is withdrawn through pipe 120 having valve 121. Gases and vapors may then pass by pipe 119 to condenser 122, from which liquids, gases and vapors pass through valve controlled pipe 123 into a sump 124 provided with a gas outlet 126 and liquid exit pipe 125. A pressure gage 116 is desirably provided on the drum 103, and pressure gages may also be desirably used at other points as on the sump 124; the latter also being provided with a relief valve if desired.

In the system of Figure 4, since vapor and gas bubbles form in the drum 103 it is desirable in this instance to have the heated oil enter through the nozzles 111' into the lower portion of the body of oil at the center thereof so that such vapors and gases will be confined within the rising central body of oil until they reach and escape into the vapor space above the oil.

In the explanation of this system illustrated in Figure 4, the fresh oil enters through pipe 104. However some of the untreated stock may be injected through pipe 105 into the oil inlets 112 and 114. Furthermore, backtrap, light tar oils, etc., may be used for obvious reasons, to cause circulation. In other words, the untreated stock, backtrap, tar oils, etc., may be repassed through the heating tube 101. However since it is sometimes undesirable to reheat the heavier oils, such as tar oils, only the lighter material, such as backtrap, delivered from the bubble tower to pipe 120, may be used in admixture with the untreated oil, such backtrap passing through the heating tube 101 with the fresh oil, while the heavier products, such as lighter materials separated in the tar tank, are passed through pipe 105 to the several inlets. Where the materials entering through pipe 105 are not hot enough to prevent material lowering of the temperature in the drum 103, they may be preheated. In any event however, it will be understood that the fresh untreated stock, the backtrap, the light tar oils, etc. will be apportioned between the several oil inlets according to the type of process being carried out, and the types of products sought.

Turning to a consideration of the system illustrated in Figure 5 utilizing an externally heated horizontal still, such a still 201, filled with oil to a desired level 202, and heated by a furnace 203, is supplied with oil pumped by pump 204 into pipes 205 and 206. Pipe 205 leads to an injector 211 provided with nozzles 211' adapted to provoke an ascending sheet of oil transversely of the body of oil undergoing treatment. To this end, the nozzles are fed from pipe 211 placed near the bottom of the still, with the nozzles projecting upwardly. The inlet pipe 206 feeds oil to an upper spray device 212, desirably in the form of two parallel pipes provided with openings or jets 213 in the lower walls of pipes 212. The pipes 212 are placed in the upper zone of the body of oil undergoing treatment, and near the outer portions thereof so that the injected oil forms two downwardly moving zones near the outer shell of the still. As a result, the oil injected through pipes 212 produces downwardly moving oil currents near the outer walls of the still while the oil injected through nozzles 211' produces an upwardly moving zone of oil adjacent the downwardly moving currents, the effect being circulation in the body of oil as illustrated in Figure 6. Tar and heavy bodies which settle below the nozzles 211' are kept in movement along the bottom of the still by oil inlets 214 which may be fed with a portion of the oil from the discharge of the pump 204, and such tar may be withdrawn through the valve controlled tar line 215. Vapors and gases escaping into the vapor space above the body of oil are withdrawn through the vapor line 217 from which they may pass into the bubble tower 218 or analogous structure. Condensates in the bubble tower may be withdrawn by means of pipe 220 provided with valve 221, while gases and vapors pass off through pipe 219 to a condenser 222 from which the products are carried by pipe 223 to a collecting vessel 224. Liquids may be withdrawn by valved outlet 225, while gases and any remaining vapors pass out through valved pipe 226. Pressure gage 216 on the still and pressure gage 227 on the collecting vessel are desirably provided. A manhole 207 allows access to the still. The collecting vessel 224 may be provided with an adjustable relief valve (not shown).

As set forth above in connection with the apparatus illustrated in Figures 1 and 4, the oil injected through the inlet devices 211, 212 and 214, produces a substantially uniform circulation throughout the body of oil of such character as to prevent the formation or deposition of hard carbon. The oil used for such circulation may be untreated stock or backtrap, tar oils, etc., either recovered in the process itself, or obtained from outside sources. Such oil or oils in any desired mixtures with each other, may be apportioned between the several oil inlets as desired.

In certain instances, it may be desired to inject gases into the body of oil undergoing treatment. Steam and residual gases from the process may be used for this purpose. In such cases, the injecting nozzles may take the form illustrated in Figure 3. The steam or residual gases, or other diluent fluid entering through pipe 405 feeds the ring 406 carrying the nozzles 407. The oil entering through pipe 209 leads through ring 410 to the nozzles 408. Desirably the nozzles 408 and 407 are concentric, so that the oil discharge through nozzles 408 form enclosing sheaths of oil about the gases discharged through the nozzles 407. However, while such duplex nozzle structure is a desirable one, if, preferred, separate nozzles may be used for the oil and steam or other vapor or gas.

In the description of the apparatus set forth above, one upper and one lower oil inlet pipe have been illustrated. However, as many such inlets may be used as are desired, although the number illustrated are sufficient for general usage. The relative position of the spray ring and other oil inlets will be determined by the type of process in which they are to be used. In general the nozzles should be at that point where the generation of vapor or gas bubbles is greatest, so that the resultant circulating stream produced by the oil injected at this point will prevent the dissemination of wild gas or vapor bubbles throughout the body of oil undergoing treatment, as more fully explained above. In whatever arrangement used, careful consideration should be given to the ratio of the incoming fluids and the force exerted by them, in relation to the volume of liquid to be circulated. To obtain the required circulation, either larger volumes of liquid may be circulated or the differential of pressure may be increased. For example, a greater volume of oil may be circulated through the still than is actually undergoing treatment therein due to the fact that vapors and gases, and tar are removed either continuously or intermittently. Or the incoming oil may be injected under pressures sufficient to produce the circulatory movement desired in the body of oil itself. However, in general, it is desirable to maintain the oil level in the still or drum, substantially constant. When oil from the light tar tank is used, more frequent drags through the tar line may be made.

The oil fed in may be readily used to control or regulate the temperature in the still, since the incoming oil is cooler than that in the still. If the temperature in the upper portion of the body of oil undergoing treatment is too high, more of the incoming oil may be charged at that point. The use of oil inlet sprays at several points in the still will enable this regulation of temperature therein to be readily maintained. The use of oil for keeping the temperature down, particularly in carrying out processes in externally fired vertical and horizontal stills, is considered to be more advantageous than is the use of internal cooling agents such as steam. The latter expedient may however be employed when desired. The differential on the oil charge line need be sufficient only to produce the desired degree of circulation.

For the most efficient circulation, the vertically disposed sprays have proved best. However, the spray openings and nozzles may be angularly disposed if desired to give a tangential or whirling movement within the circulating body of oil, without destroying the circulatory current. Since in such cases much of the force of the injected fluids is consumed in producing such whirling movement thereby diminishing the force available for producing the circulation proper, the vertically disposed sprays and nozzles are considered to be preferable.

It should be particularly noted that in the present case, all stirrers are eliminated, and in fact no elements in motion are required. Further the still is kept practically free from apparatus, the rings and pipes placed therein in accordance with the present invention being reduced to a minimum, and of such simple construction that with the elimination of hard carbon formation, no attention is required by those pipes, etc., within the still. The stuffing boxes hitherto required in the prior art are avoided with resultant elimination of leaks through such elements—a major source of trouble in prior art devices.

The present invention maintains the oil or other liquid in circulation, permitting no quiescent zones therein, and no dissemination of wild gas or vapor bubbles throughout the liquid. The circulation is maintained substantially uniform throughout the oil undergoing treatment by supplementing the movement caused by the oil jets, at various points in the body of oil removed from the oil jets, the secondary circulatory movements complementing that initially induced at the oil jets. Sufficient sprays, etc. should be used to obtain the required circulation, and for any given still may be readily determined in accordance with the present disclosure.

The present invention is not limited to the treatment of hydrocarbon oils but may be utilized in any process of treatment of liquid or molten materials wherein uniformity of operating conditions are indicated. However the present invention is particularly important in the heat treatment or cracking of hydrocarbon oils or related materials, particularly under pressure, in view of the fact that hard carbon formation is substantially avoided. Among the materials that may be treated there may be mentioned petroleum and its various distillates, shale products and tars, pitches, waxes, paraffin, sludges, residues from the petroleum industry, asphaltic oils, malthas, asphalt, cracked oils and residues from cracking stills, wood tar oils and wood tars, peat distillates, lignite distillates, distillation products from coal, and oils such as petroleum oil containing solid substances in suspension, such as coal, coke, peat, carbon, etc.

In the treatment of petroleum and related materials, elevated temperatures and pressures may be used, particularly of such magnitude as are at present used in the art of "cracking." For example, in the tube and drum process the pressure in the drum may be from 100 to 400 lbs./sq. in., while the temperature in the tube may be from 700 to 850° F., and in the drum, from 700 to 950° F. as exemplary hereof in treating a paraffin base gas oil, a pressure of 200 lbs. and a temperature of 850° F. in the coil and of 775° F. in the drum, may be used.

In general, pressures of from 50 to 500 lbs./sq. in. with temperatures ranging from 300 to 1000° F., may be employed. But the invention may also be used in processes operated at atmospheric pressures, or even at pressures below atmospheric.

The temperature and pressure conditions are very important items in these processes. Heretofore in the art, it has been recognized that the higher the temperatures that are used, the greater is the efficiency of the process. But the formation of hard carbon in such prior art processes increasing with the rise in temperature, acted as a deterrent to the use of such higher temperatures otherwise indicated as desirable. In processes utilizing the present invention, on the other hand, since the formation or deposition of hard carbon in these processes, is substantially eliminated, temperatures above those at present actually used in the art are usable with corresponding increase in the efficiency of the process. This result is of monumental importance in this art.

In processes utilizing high pressures, the still or drum should be sufficiently strong to withstand such pressures. In the tube and drum process, it is desirable to insulate the drum against loss of heat, as by covering said drum with a heat insulating jacket, and such heat insulation covering may be used on any of the pipes or other portions of apparatus as desired.

The products obtained include the usual products of heat treatment of petroleum and related materials, except that higher yields of gasoline are obtainable when higher temperatures are employed.

It has been pointed out above that the circulation which is obtained in any given case is dependent on a number of factors among which has been noted the differential of pressure and the amount of liquid injected in a given unit of time. These factors are of course coordinate, since increase in differential or increase in the volume of liquids injected to serve the desired end. However in the preferred instances it is considered best to inject a volume of liquid per hour which is equal to the contents of the still, as the minimum amount of liquid to be injected. In one example, charging a volume of liquid per hour equal to the contents of the still, under a differential pressure of 5 pounds gave sufficient circulation to prevent hard carbon formation, the still contents in this instance being 55 bbls. By increasing the volume of charged liquid, or by increasing the differential pressure under which it is charged, or by both expedients the desired circulation can be obtained in any given instance, the higher volumes charged and higher differentials being used when higher temperatures are to be used in the process.

In referring above to the oil which may be used for circulation purposes, oil from the light tar tank and other sources has been referred to. In addition light tar itself is usable, it being generally undesirable to use the heavier tar portions. Furthermore oil may be withdrawn from the still itself, at any particular point desired and recharged thereto through any of the injecting devices described in order to enhance the circulation. If the drags through the tar line are taken at very frequent intervals or at least at a rate greater than the accumulation of tar or heavier materials in the bottom of the still, oil may be withdrawn at this point and this oil used for causing circulation in any of the manners described above.

A remarkable feature of the present invention is the substantial absence of hard or adherent carbon not only from the oil in the still, but also from the tar or residuum withdrawn therefrom. This fact strikingly differentiates the present invention over prior art practice.

By the term "circulation" as used in this application and claims it is intended to cover actual circulatory currents in the body of oil undergoing treatment and not mere agitation.

Having thus set forth my invention, I claim:—

1. A process of heat treating hydrocarbon oils to produce lighter distillates therefrom which comprises maintaining a body of oil under conversion conditions of temperature and pressure, and injecting oppositely directed non-planar oil streams within said oil at a number of segregated points to produce substantially uniform circulation throughout the body of oil, at a velocity high enough to substantially eliminate the formation of hard or adherent carbon, the volume of injected oil at the points of injection varying directly in volume with the cross sectional area of oil to be moved at those points.

2. A process of heat treating hydrocarbon oils to produce lighter distillates therefrom which comprises injecting oppositely directed non-planar oil streams within a body of oil under conversion conditions of temperature and pressure, to produce circulation within the body of oil of character and velocity sufficient to prevent formation of hard carbon.

3. In a process of heat treating a body of petroleum maintained under conversion conditions of temperature and pressure, the step of injecting oppositely directed non-planar oil streams within the body of petroleum to produce circulation therein sufficient to eliminate the formation of hard carbon.

4. A process of heat treating hydrocarbon oils to produce lighter distillates therefrom which comprises maintaining a body of oil under conversion conditions of temperature and pressure, injecting upwardly directed streams of oil within the body of oil in a lower zone thereof, to produce an upwardly moving current of oil and injecting a downwardly directed oil stream into the body of oil in an upper zone thereof to produce a downwardly moving oil current in said body of oil said downwardly directed oil stream, supplementing said upwardly moving oil current, whereby circulatory currents are set up throughout the body of oil, and the deposition of hard carbon is substantially eliminated.

5. A process as set forth in claim 4 wherein residuum is allowed to settle below the lower oil inlet but is circulated below said lower oil inlet by injected oil currents.

6. A process of heat treating hydrocarbon oils to produce lighter distillates therefrom which comprises maintaining a contained body of oil under conversion conditions of temperature and pressure, and injecting oil streams within said body of oil to produce circulatory currents of such character as to confine gas and vapor bubbles within a column of rising oil, and prevent the free dissemination of wild gas and vapor bubbles in the body of oil, whereby the deposition of hard carbon is substantially eliminated.

7. A process as set forth in claim 4 wherein the injected oil is in part, oil recovered from vapors and gases generated during the process.

8. A process as set forth in claim 4, wherein the injected oil is in part, light oil separated from tar withdrawn from the treatment zone during the process.

9. A process as set forth in claim 5 wherein the temperature of the body of oil is controlled at least in part by the oil injected into the oil undergoing treatment.

10. A process as set forth in claim 4 wherein the body of oil is maintained at substantially uniform depth.

11. A process as set forth in claim 4 wherein the volume of oil continuously removed from and added to the body of oil undergoing treatment is greater than the volume of the oil converted into and withdrawn as gaseous and vaporous products.

12. In a process of heat treating hydrocarbon oil to produce lighter distillates therefrom wherein oil is passed through a tube in which it is heated to an elevated temperature and then passed to a soaking drum, the step of producing circulation of the oil in said drum by oppositely directed non-planar, injected oil streams sufficient to eliminate any substantial formation of hard carbon therein.

13. In a process of heat treating hydrocarbon oil to produce lighter distillates therefrom wherein oil is passed through a tube in which it is heated to an elevated temperature, and then passed to a soaking drum where it is subjected to conversion conditions of temperature and pressure, the step of injecting oppositely directed non-planar oil streams within the body of oil in the soaking drum to produce circulatory currents therein to eliminate any substantial formation of hard carbon.

14. A process of heat treating hydrocarbon oils to produce lighter distillates therefrom which comprises maintaining a body of oil under conversion conditions of temperature and pressure, injecting a stream of oil within said body of oil to produce movement of a substantial portion of said body of oil in a given direction, and injecting a second stream of oil into said body of oil at a point removed from the point of injection of the first stream of oil whereby the aforesaid movement of the portion of the body of oil is enhanced, and the deposition of hard carbon is substantially eliminated.

15. A process of heat treating hydrocarbon oils to produce lighter distillates therefrom which comprises maintaining a body of oil under conversion conditions of temperature and pressure, injecting a stream of oil within said body of oil to produce controlled movement of a portion of the body of oil for a given distance, and injecting a second stream of oil within said body of oil at the point aforesaid where such controlled movement of the portion of the body of oil would normally tend to cease, whereby controlled movement of the oil is maintained, and the deposition of hard carbon is substantially eliminated.

HENRY C. KIRK.

CERTIFICATE OF CORRECTION.

Patent No. 1,676,230.

Granted July 3, 1928, to

HENRY C. KIRK.

It is hereby certified that error appears in the printed specification of the above numbered patent requiring correction as follows: Page 5, line 101, for the word "to" read "will"; page 6, line 92, claim 9, for "claim 5" read "claim 4"; and that the said Letters Patent should be read with these corrections therein that the same may conform to the record of the case in the Patent Office.

Signed and sealed this 7th day of August, A. D. 1928.

(Seal)

M. J. Moore,
Acting Commissioner of Patents.

and pressure, injecting a stream of oil within said body of oil to produce movement of a substantial portion of said body of oil in a given direction, and injecting a second stream of oil into said body of oil at a point removed from the point of injection of the first stream of oil whereby the aforesaid movement of the portion of the body of oil is enhanced, and the deposition of hard carbon is substantially eliminated.

15. A process of heat treating hydrocarbon oils to produce lighter distillates therefrom which comprises maintaining a body of oil under conversion conditions of temperature and pressure, injecting a stream of oil within said body of oil to produce controlled movement of a portion of the body of oil for a given distance, and injecting a second stream of oil within said body of oil at the point aforesaid where such controlled movement of the portion of the body of oil would normally tend to cease, whereby controlled movement of the oil is maintained, and the deposition of hard carbon is substantially eliminated.

HENRY C. KIRK.

CERTIFICATE OF CORRECTION.

Patent No. 1,676,230.

Granted July 3, 1928, to

HENRY C. KIRK.

It is hereby certified that error appears in the printed specification of the above numbered patent requiring correction as follows: Page 5, line 101, for the word "to" read "will"; page 6, line 92, claim 9, for "claim 5" read "claim 4"; and that the said Letters Patent should be read with these corrections therein that the same may conform to the record of the case in the Patent Office.

Signed and sealed this 7th day of August, A. D. 1928.

(Seal)

M. J. Moore,
Acting Commissioner of Patents.